…

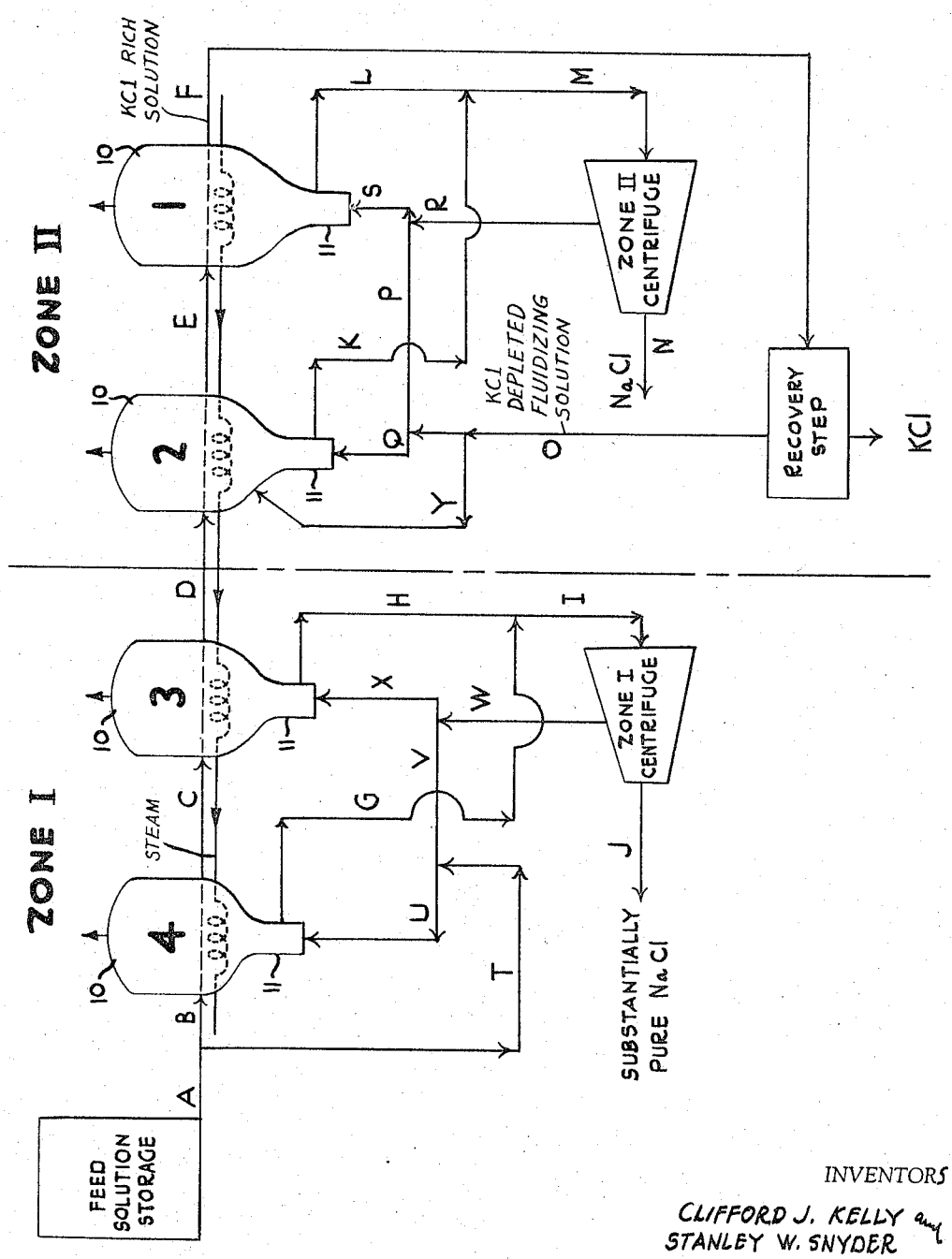

United States Patent Office 3,365,278
Patented Jan. 23, 1968

3,365,278
RECOVERY OF POTASSIUM CHLORIDE FROM SODIUM CHLORIDE SOLUTION
Clifford J. Kelly and Stanley W. Snyder, Regina, Saskatchewan, Canada, and James L. Jamieson, Akron, Ohio, assignors to Kalium Chemicals Limited, Regina, Saskatchewan, Canada, a corporation of Canada
Filed Aug. 5, 1965, Ser. No. 477,514
8 Claims. (Cl. 23—296)

This invention relates to the recovery of solid potassium chloride from solutions containing both sodium chloride and potassium chloride. More particularly, this invention relates to fluidizing solids settling in the elutriation legs of evaporating equipment employed in concentrating such solutions.

A recognized method for recovering potassium chloride from aqueous solutions containing both potassium and sodium chlorides is to first remove water therefrom to produce a solution at approximately the "invariant composition" and then cool the solution to precipitate potassium chloride. Usually large amounts of sodium chloride and significant amounts of impurities, notably chlorides and sulfates, are precipitated during the evaporation step.

By "invariant compositions," as used herein and in the claims, is meant the composition at which an aqueous solution at a given temperature is saturated with respect to both NaCl and KCl. The invariant composition is affected by the presence of compounds other than NaCl and KCl in the solution. Thus, for example, the invariant composition of an aqueous solution containing only NaCl and KCl at 231° F. is about 27.4 p.p.h. (parts by weight per hundred parts by weight water) NaCl and about 38.2 p.p.h. KCl. The invariant composition of a similar solution containing 6.0 p.p.h. $MgCl_2$ is about 24.7 p.p.h. NaCl and about 34.0 p.p.h. KCl. The solutions contemplated by this invention normally contain significant amounts of salts other than NaCl and KCl.

In a typical evaporation step, there are provided a series of evaporator effects. Each effect operates at a selected temperature. In the evaporation of solutions containing both NaCl and KCl, the evaporator effects advantageously operate at progressively higher temperatures in the direction of liquor flow. A typical evaporator effect comprises an evaporator communicating with an elutriation leg. The evaporator is usually in the form of a large vessel or tank. The elutriation leg is usually in the form of a smaller tank or column openly communicating with the lower portion of the evaporator. The required volume capacity of the effects may vary considerably because of varying volumes of recycle streams and because of the removal of water and salts from the liquor as it moves through the several effects.

As the solution passes through an evaporator, water is removed therefrom. The solution becomes more concentrated with respect to the salts therein. Eventually, solids precipitate and settle to the bottom of the evaporator. The solubility of KCl increases with the temperature of the solution. The solubility of NaCl is relatively independent of temperature. Thus, the precipitating solids predominate in sodium chloride. Significant quantities of impurities may precipitate along with the NaCl. Typical of such impurities are calcium sulphate, calcium chloride, calcium carbonate and calcium bicarbonate. These precipitated impurities settle to the bottom of the evaporator and into the elutriation leg. Most of the impurities entering the elutriation leg are of smaller particle size than the sodium chloride precipitate. Raw feed solution is typically introduced at the lower portion of the elutriation leg as a fluidizing liquid. This liquid rises up through the leg countercurrent to the settling solids. The ascending fluid stream carries substantially all of the fine particle impurities back up into the evaporator while the relatively heavy particles settle to the lower portion of the elutriation leg. In an evaporation effect in which most of the impurities are of small particle size, relatively pure sodium chloride is conveniently recovered from the elutriation leg underflow. The impurities washed back into the evaporator tend to be carried along with the evaporator overflow to the next evaporator effect. In subsequent effects the impurities often increase in size. These impurities may ultimately become of sufficient size that they settle through the fluidizing liquid of the elutriation leg along with the sodium chloride particles. The NaCl recovered from these effects typically contains undesirable amounts of impurities.

From the last evaporator effect, concentrated NaCl and KCl solution, usually at about the invariant composition, is forwarded to a recovery operation. The feed to the recovery stage should be above about 85, preferably above about 90 to about 97 percent saturated with respect to KCl. A typical recovery step is a crystallizing operation wherein the solution is cooled to precipitate KCl therefrom. Because the solubility of NaCl is substantially independent of temperature, the KCl produced in this manner is nearly NaCl free. The effluent from the recovery step often contains a higher ratio of KCl to NaCl than the raw solution initially fed to the evaporator step. This effluent solution also contains undesirably high levels of impurities such as magnesium chloride and calcium sulfate. Thus, at least a portion of this effluent sufficient to maintain the impurity level below an acceptable limit is of necessity purged.

According to the instant invention, it has been found advantageous to recycle a portion of the effluent from the recovery operation to the elutriation legs of the evaporator effects. It has been found particularly advantageous to divide the evaporator effects into a first zone which includes the lowest temperature effect and a second zone which includes a higher temperature evaporator effect. Raw feed solution is then utilized as a fluidizing stream in the first zone and recycle recovery effluent is used for a fluidizing stream in the second zone. In this fashion the impurity level in the first zone is maintained at a low level. Thus, scaling problems normally associated with high sulfate concentrations are avoided in this zone. In addition, the solid NaCl withdrawn from the first one is essentially free of sulfate and other impurities thereby enhancing its value as a by-product.

A noteworthy advantage of introducing recycle effluent rather than raw feed solution to the elutriation legs of the hotter evaporators is to decrease the amount of heat, e.g., steam, required to evaporate the water from the system. In this fashion, the cost of the operation is significantly reduced.

The accompanying drawing is a flow sheet which illustrates the present invention. The flow sheet includes evaporator effects 1 through 4. Evaporator effect 4 actually includes the initial evaporator. Evaporator 1 is in the final (hottest) evaporator effect. The numbering of the evaporator effects is in the direction of steam flow which is countercurrent to the direction of solution (liquor) flow. It is assumed for purposes of this description that the evaporators are heated by means of steam. Other heating means are within contemplation.

Each evaporator effect comprises an evaporator 10 and elutriation leg 11. The evaporators and elutriation legs may be of any size required to accommodate feed stream A. The elutriation legs 11 are appropriately sized to fluidize the quantities of solids precipitating from the evaporator. The instant invention is operable in any commercially sized equipment.

According to the flow sheet, the evaporators are divided into two zones. Zone I includes the two cooler evaporator effects 4 and 3, respectively. Zone II includes evaporator effects 2 and 1, the hotter evaporator effects. Feed stream A is divided into streams B and T. Stream B is fed into evaporator 4. Effluent C flows from evaporator 4 to evaporator 3. Effluent D from evaporator 3 flows to evaporator 2. Effluent E from evaporator 2 flows to evaporator 1. Effluent F from evaporator effect 1 is passed to the crystallizing operation where the solution is cooled to precipitate KCl.

contemplation that process streams of different compositions, e.g., zone I centrifuge effluent W, be mixed with one or more of these streams. Preferably, stream W is utilized as all or part of the fluidizing liquid in evaporator effect 3. Although elutriation stream X entering evaporator effect 3 is thereby of different composition than elutriation stream U entering evaporator effect 4, neither U nor X contain substantial amounts of impurities.

Effluent O from the crystallizers is utilized in the elutriation fluidizing streams flowing to evaporators 1 and 2 of zone II. A portion Y of stream O may be directly recycled, e.g., to evaporator 2. By confining the effluent recycle to zone II, the NaCl removed from zone I is maintained at a high level of purity. Stream O is conveniently divided (streams Q and P) similarly as stream T. Overflow (effluent) R from the zone II centrifuge may be used as all or part of the fluidizing liquid in effect 1. Preferably stream R is mixed with stream P.

The following table reports typical ranges of composition of the several streams illustrated in the flow sheet. The values are reported as pounds per 100 pounds of water in the feed (stream A) and are generally applicable to commercially sized evaporation equipment, e.g., 10,000 or more gallons internal volume.

As a specific example of the hereindescribed process, a feed stream containing 31.3 pounds of NaCl and 12.6 pounds of KCl per 100 pounds of water was fed to the fourth effect evaporator of a commercial plant operating with the flow sheet depicted in the drawing. The following

TABLE I

| Stream | Identification | Temperature, °F. | Amount, lb./100 lb. $H_2O$ in Feed Brine | | | | | | |
|---|---|---|---|---|---|---|---|---|---|
| | | | NaCl | KCl | $MgCl_2$ | $CaCl_2$ | $CaSO_4$ | $H_2O$ | Σ |
| A | Brine Feed | 100-150 | 24.0-34.0 | 8.0-25.0 | 0.0-0.30 | 0.0-0.10 | 0.0-1.00 | 100 | 133-150 |
| B | 4th Effect Evaporator Feed | 100-150 | 0.0-27.2 | 0.0-21.3 | 0.0-0.25 | 0.0-0.08 | 0.0-0.85 | 0.0-85 | 0-134 |
| C | 4th Effect Evaporator Effluent / 3rd Effect Evaprator Feed | 105-135 | 12.0-26.0 | 4.0-21.3 | 0.0-0.25 | 9.0-0.25 | 0.0-0.85 | 40-80 | 56-114 |
| D | 3rd Effect Evaporator Effluent / 2nd Effect Evaprator Feed | 130-180 | 14.0-17.0 | 8.0-25.0 | 0.0-0.30 | 0.0-0.10 | 0.0-1.00 | 50-60 | 75-100 |
| E | 2nd Effect Evaporator Effluent / 1st Effect Evaporator Feed | 165-215 | 15.5-28.5 | 13.9-36.3 | 0.5-6.20 | 0.26-3.00 | 0.19-1.10 | 55-122 | 95-172 |
| F | 1st Effect Evaporator Effluent | 210-250 | 13.5-36.0 | 24.6-43.0 | 0.9-6.00 | 0.46-3.20 | 0.15-0.35 | 60-160 | 112-235 |
| G | 4th Effect Evaporator Underflow | 100-150 | *4-10 / 1.0-10.8 | 1.3-6.00 | 0.006-.027 | 0.002-.012 | 0.04-0.18 | 8-35 | *4-10 / 12-52 |
| H | 3rd Effect Evaporator Underflow | 100-180 | *6-9 / 1.0-4.5 | 1.1-4.8 | 0.006-.027 | 0.002-.012 | 0.04-0.18 | 4-17 | *6-9 / 6-27 |
| I | 3rd & 4th Effect Evap. Underflow | 100-180 | *10-19 / 2.0-15.3 | 2.4-10.8 | 0.012-.054 | 0.004-.024 | 0.06-0.36 | 12-52 | *10.19 / 18-79 |
| J | Tailings, 3 and 4 Centrifuge | 100-160 | 10-19 | | | | | | 12-17 |
| K | 2nd Effect Evap. Underflow | 140-230 | *6-9 / 1.0-4.5 | 1.1-4.8 | 0.1-0.4 | 0.04-0.22 | *0.10-30 / 0.01-0.06 | 4-18 | *6.10-9-3 / 6-28 |
| L | 1st Effect Evap. Underflow | 140-230 | *6-9 / 1.0-4.5 | 1.1-6.6 | 0.2-0.78 | 0.1-0.38 | *0.10-.20 / 0.006-.03 | 4-19 | *6.1-9.2 / 6.7-32 |
| M | 1st & 2nd Effect Evap. Underflow | 140-230 | *12-18 / 2.0-9.0 | 2.2-11.4 | 0.3-1.18 | 0.14-0.6 | *.20-50 / 0.01-0.09 | 8.37 | *12.2-18.5 / 12.7-60 |
| N | Tailings, 1 and 2 Centrifuge | 140-230 | 12-18 | | | | 0.0-1.00 | | 12-18 |
| O | Recycle to 1 and 2 Effect Evaporators | 89-170 | 15.0-36.0 | 12.0-30.0 | 1.0-6.0 | 0.5-3.2 | 0.15-0.35 | 60-160 | 89-235 |
| P | Recycle to 1st Effect Evaporator | 80-170 | 0.0-18.0 | 0.0-15.0 | 0.0-3.0 | 0.0-1.6 | 0.0-0.17 | 0-80 | 0-118 |
| Q | Recycle to 2nd Effect Evaporator | 80-170 | 3.0-18.0 | 3.2-15.0 | 0.3-3.3 | 0.2-1.6 | 0.04-0.17 | 11.6-80 | 18-118 |
| R | Recycle from 1st & 2nd Effect Centrifuge | 140-230 | 2.0-9.00 | 2.1-11.7 | 0.25-1.2 | 0.15-0.6 | 0.02-0.09 | 8.0-37 | 12.7-60 |
| S | Elutriation Leg, 1st Effect Evaporator | 140-230 | 3.0-18.0 | 3.2-15.0 | 0.3-3.3 | 0.2-1.8 | 0.05-22.0 | 12-80 | 18-118 |
| T | Brine Feed to 3rd & 4th Effect Evaps | 100-150 | 3.6-32.0 | 1.2-25.0 | 0.045-0.3 | 0.015-0.1 | 0.15-1.00 | 15-100 | 19.8-150 |
| U | Brine Feed to 4th Effect Evaporator | 100-150 | 3.8-23.6 | 1.8-17.9 | 0.029-.17 | 0.010-.06 | 0.11-0.68 | 13.5-76.0 | 18.9-114 |
| V | Brine Feed to 3rd Effect Evaporator | 100-150 | 0.8-8.40 | 0.6-7.10 | 0.016-.13 | 0.005-.05 | 0.04-0.32 | 1.5-24.0 | 0.9-36 |
| W | Recycle from 3rd & 4th Effect Evaps. Centrifuge | 100-160 | 2.0-15.3 | 2.4-10.8 | 0.012-.054 | 0.004-.024 | 0.08-0.36 | 12-52 | 18-79 |
| X | Elutriation Leg, 3rd Effect Evap | 100-160 | 2.8-23.6 | 1.8-17.9 | 0.029-0.17 | 0.01-0.06 | 0.11-0.68 | 13.5-76 | 18.9-114 |
| Y | Recyle to 2nd Effect Evaporator | 80-170 | 0.0-16.0 | 0.0-12.9 | 0.0-6.0 | 0.0-3.0 | 0.0-0.15 | 0.69.6 | 0-107.6 |

*Solid.

Stream T is divided into streams U and V. Stream U is utilized as fluidizing liquid in evaporator effect 4. Stream V is utilized as fluidizing liquid in evaporator effect 3. Streams B, T, U and V typically have about the same composition as feed stream A although it is within Table II reports the operating conditions employed and the composition of the several process streams designated in the drawings. Stream Y is not reported in Table I. In practice, stream Y can be any convenient portion of stream O.

TABLE II

| Stream | °F. | H₂O | Solution Composition Parts per 100 Parts H₂O | | | | | Solids per 100 lbs. H₂O in Feed | |
|---|---|---|---|---|---|---|---|---|---|
| | | | NaCl | KCl | MgCl₂ | CaCl₂ | CaSO₄ | NaCl | CaSO₄ |
| A | 135 | 100.0 | 31.3 | 12.6 | 0.059 | 0.029 | 0.36 | | |
| B | 135 | 47.25 | 31.3 | 12.6 | 0.059 | 0.029 | 0.36 | | |
| C | 125 | 50.60 | 30.6 | 17.1 | 0.08 | 0.039 | 0.49 | | |
| D | 158 | 54.61 | 29.4 | 23.0 | 0.107 | 0.052 | 0.64 | | |
| E | 193 | 66.20 | 26.0 | 28.4 | 2.40 | 1.25 | 0.32 | | |
| F | 231 | 81.52 | 23.6 | 34.0 | 4.00 | 1.97 | 0.21 | | |
| G | 125 | 11.69 | 30.6 | 17.1 | 0.80 | 0.039 | 0.49 | | |
| H | 158 | 2.57 | 29.4 | 23.0 | 0.107 | 0.052 | 0.64 | 8.2 | |
| I | 135 | 14.26 | 30.3 | 18.2 | 0.084 | 0.041 | 0.52 | 7.6 | |
| J | 135 | | | | | | | 15.8 | |
| K | 193 | 5.77 | 26.0 | 28.4 | 2.400 | 1.25 | 0.32 | 15.8 | 0.20 |
| L | 231 | 6.54 | 23.6 | 34.0 | 4.00 | 1.97 | 0.21 | 7.2 | 0.14 |
| M | 164 | 12.31 | 24.7 | 31.4 | 3.25 | 1.62 | 0.26 | 8.5 | 0.34 |
| N | 164 | | | | | | | 15.7 | 0.34 |
| O | 110 | 80.87 | 23.3 | 18.7 | 3.96 | 1.95 | 0.21 | 15.7 | |
| P | 110 | 38.74 | 23.3 | 18.7 | 3.96 | 1.95 | 0.21 | | |
| Q | 110 | 42.12 | 23.3 | 18.7 | 3.96 | 1.95 | 0.21 | | |
| R | 164 | 12.31 | 24.7 | 31.4 | 3.25 | 1.62 | 0.26 | | |
| S | 164 | 51.06 | 23.6 | 21.8 | 3.79 | 1.77 | 0.22 | | |
| T | 135 | 52.75 | 31.3 | 12.6 | 0.059 | 0.029 | 0.36 | | |
| U | 135 | 37.99 | 31.3 | 12.6 | 0.059 | 0.029 | 0.36 | | |
| V | 135 | 14.76 | 31.3 | 12.6 | 0.059 | 0.029 | 0.36 | | |
| W | 135 | 14.26 | 30.3 | 18.2 | 0.084 | 0.041 | 0.52 | | |
| X | 135 | 29.03 | 30.8 | 15.4 | 0.071 | 0.035 | 0.44 | | |

The effluent from the evaporation step, i.e., the feed to the recovery step F should contain a weight ratio of KCl to NaCl of about 1.50 to about 1.30, preferably about 1.50 to about 1.40. The effluent from the recovery step typically contains a weight ratio of KCl to NaCl of about 0.5 to about 0.9, preferably about 0.7 to about 0.8.

Although the drawing illustrates an embodiment wherein the evaporator effects are evenly distributed between zones I and II, it should be understood that zone I may contain either fewer or more evaporator effects than zone II. Any effect may comprise a plurality of evaporators. Any evaporator may communicate with a plurality of elutriation legs.

Although the present invention has been described with reference to particular details of certain specific embodiments, it is not intended to thereby limit the scope of the invention except insofar as the specific details appear in the appended claims.

We claim:

1. In the recovery of KCl from aqueous solutions containing both KCl and NaCl by passing the solution through a series of evaporators each of which communicates with an elutriation leg to drive off water and precipitate NaCl and impurities therewith from said solution, introducing fluidizing liquid upwardly through the elutriation legs to fluidize the said NaCl and impurities therein and to carry impurities back to the evaporators while permitting an increase in the concentration of NaCl in said elutriation legs to substantially higher concentration than in the evaporators, withdrawing an aqueous slurry containing NaCl crystals from said elutriation legs, forwarding concentrated KCl solutions from the evaporators to a recovery step and recovering KCl therefrom, the improvement which comprises utilizing KCl depleted solution from the recovery step containing a higher ratio of KCl to NaCl than the raw solution being fed to the evaporators as a fluidizing liquid in the elutriation legs.

2. The method of claim 1 wherein the evaporators through which the solution is forwarded operate at progressively hotter temperatures in the direction of flow of the solution and KCl depleted effluent from the KCl recovery operation is fed to the elutriation legs communicating with the hottest of said evaporator effects.

3. In the recovery of KCl from an aqueous solution containing both NaCl and KCl by feeding the solution through a series of evaporators operating at progressively hotter temperatures to remove water from said solution and precipitate NaCl and impurities therefrom, each of said evaporators communicating with an elutriation leg, fluidizing solid NaCl and solid impurities settling in said elutriation legs by feeding a liquid upwardly to the lower portion thereof while permitting the said NaCl and impurities concentration in the legs to increase to substantially higher than the solids concentration in the evaporators, withdrawing solid NaCl from the elutriation legs, forwarding KCl in solution from the hottest evaporator to a KCl recovery step wherein KCl is removed therefrom and recycling a portion of the resulting KCl depleted solution to the evaporators, the improvement which comprises recycling depleted effluent from the recovery step containing a higher ratio of KCl to NaCl than the raw solution being fed to the evaporators as a fluidizing liquid to the elutriation legs communicating with the hottest evaporator.

4. The process of recovering KCl from a feed solution containing both KCl and NaCl which comprises forwarding the feed solution to an evaporation zone comprising at least one evaporator effect including an evaporator in communication with an elutriation leg, removing water from said solution and precipitating NaCl and impurities therefrom thereby enriching the solution with respect to KCl, withdrawing solid NaCl from at least one elutriation leg of said evaporator zone, forwarding the KCl enriched solution from said evaporation zone to a further evaporation zone comprising at least one evaporator effect including an evaporator in communication with an elutriation leg, removing additional water and NaCl from the solution thereby further enriching the solution with respect to KCl, withdrawing solid NaCl from at least one elutriation leg of said further evaporation zone, forwarding said further enriched solution to a KCl recovery step and removing KCl therefrom while fluidizing the NaCl and impurities in the elutriation legs from which NaCl is withdrawn to carry impurities back to the evaporators in communication therewith by introducing as a fluidizing liquid a portion of the KCl depleted solution resulting from the KCl recovery step upwardly through the elutriation legs of the second-named evaporation zone, said KCl depleted solution containing a higher ratio of KCl to NaCl than the raw solution being fed to the evaporators thereby maintaining a desired minimum ratio of KCl and NaCl in solution in the evaporators of said second-named evaporation zone and introducing feed solution as a fluidizing liquid to the elutriation leg of the first-named evaporation zone thereby maintaining a low impurity level in the solid NaCl withdrawn from the elutriation leg of the same evaporation zone.

5. The method of claim 4 wherein the feed to the KCl recovery step contains a weight ratio of KCl to NaCl of 1.5 to 1.3 and the KCl depleted solution from the recovery step contains a weight ratio of KCl to NaCl of 0.5 to 0.9.

6. The method of claim 4 wherein the solution fed from the second-named evaporator zone to the KCl recovery step is 90 to 97 percent saturated with respect to KCl.

7. The process of recovering KCl from a feed solution containing KCl and at least 24 pounds of NaCl per 100 pounds of water which comprises forwarding the feed solution through an evaporator effect comprising an evaporator in communication with an elutriation leg, removing water from said solution and precipitating NaCl and impurities therefrom thereby enriching the solution with respect to KCl, withdrawing solid NaCl from the elutriation leg, forwarding the KCl enriched solution from said evaporator effect to a second evaporator effect comprising an evaporator and an elutriation leg operating at a higher temperature than the first-named evaporator effect, removing additional water and NaCl from the solution thereby further enriching the solution with respect to KCl, withdrawing NaCl from the second-named elutriation leg, forwarding the KCl enriched solution from said evaporator effect to a third evaporator effect comprising an evaporator and an elutriation leg operating at a higher temperature than the second-named evaporator effect, removing additional water and NaCl from the solution thereby further enriching the solution with respect to KCl, withdrawing NaCl from the third-named elutriation leg, forwarding the thus enriched KCl solution from said third evaporator effect to a fourth evaporator effect comprising an evaporator and an elutriation leg operating at a higher temperature than the third-named evaporator effect, removing additional water and NaCl from the solution thereby further enriching the solution with respect to KCl, withdrawing NaCl from the last named elutriation leg, forwarding enriched KCl solution to a KCl recovery step and removing KCl therefrom while fluidizing the solids in the elutriation legs from which NaCl is withdrawn to carry impurities back to the evaporators in communication therewith by introducing as a fluidizing liquid to the first-named evaporator effect feed solution and to the last named evaporator effect effluent from the KCl recovery step, said KCl depleted solution containing a higher ratio of KCl to NaCl than the raw solution being fed to the evaporators.

8. The method of claim 7 wherein feed solution is utilized as a fluidizing liquid in the first-named and second-named evaporation effects and depleted effluent from the KCl recovery step is utilized as the fluidizing liquid in the third-named and last named evaporator effects.

References Cited
UNITED STATES PATENTS

| | | | |
|---|---|---|---|
| 1,873,251 | 8/1932 | Allen | 23—302 |
| 3,198,608 | 8/1965 | Miller | 23—89 |

NORMAN YUDKOFF, *Primary Examiner.*

WILBUR L. BASCOMB, Jr., *Examiner.*

G. HINES, *Assistant Examiner.*

UNITED STATES PATENT OFFICE
CERTIFICATE OF CORRECTION

Patent No. 3,365,278                      January 23, 1968

Clifford J. Kelly et al.

It is certified that error appears in the above identified patent and that said Letters Patent are hereby corrected as shown below:

Column 2, line 57, "one" should read -- zone --.

Columns 3 and 4, TABLE I, seventh column, line 3 thereof, "9.0-0.25" should read -- 0.0-0.25 --; same TABLE I, second column, last line thereof, "Recy.e" should read -- Recycle --; same TABLE I, ninth column, last line thereof, "0.69.6" should read -- 0-69.6 --.

Signed and sealed this 21st day of October 1969.

(SEAL)
Attest:

Edward M. Fletcher, Jr.               WILLIAM E. SCHUYLER, JR.
Attesting Officer                       Commissioner of Patents